(No Model.) 2 Sheets—Sheet 1.
T. C. & J. NELSON.
RICE PLANTER.
No. 317,565. Patented May 12, 1885.
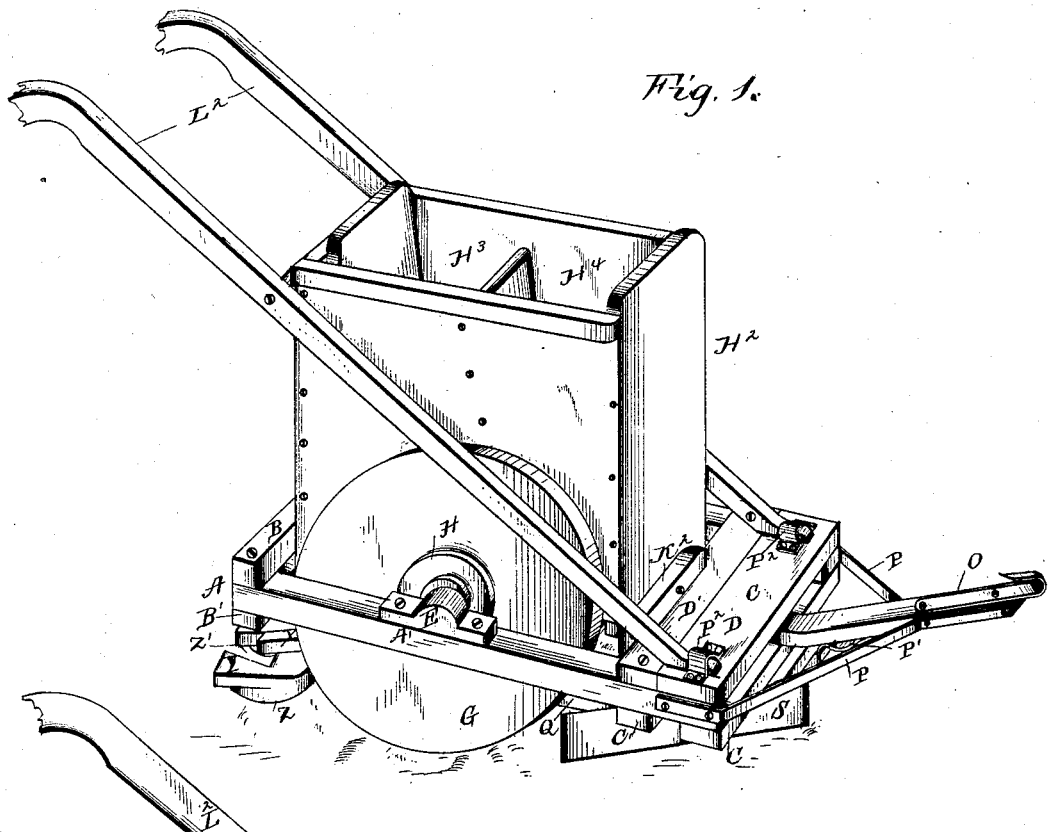
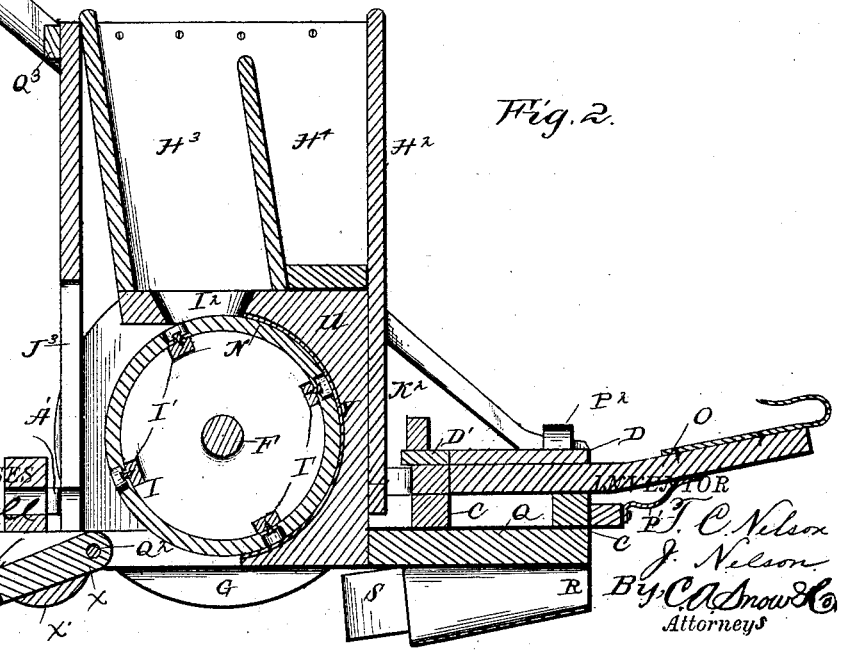

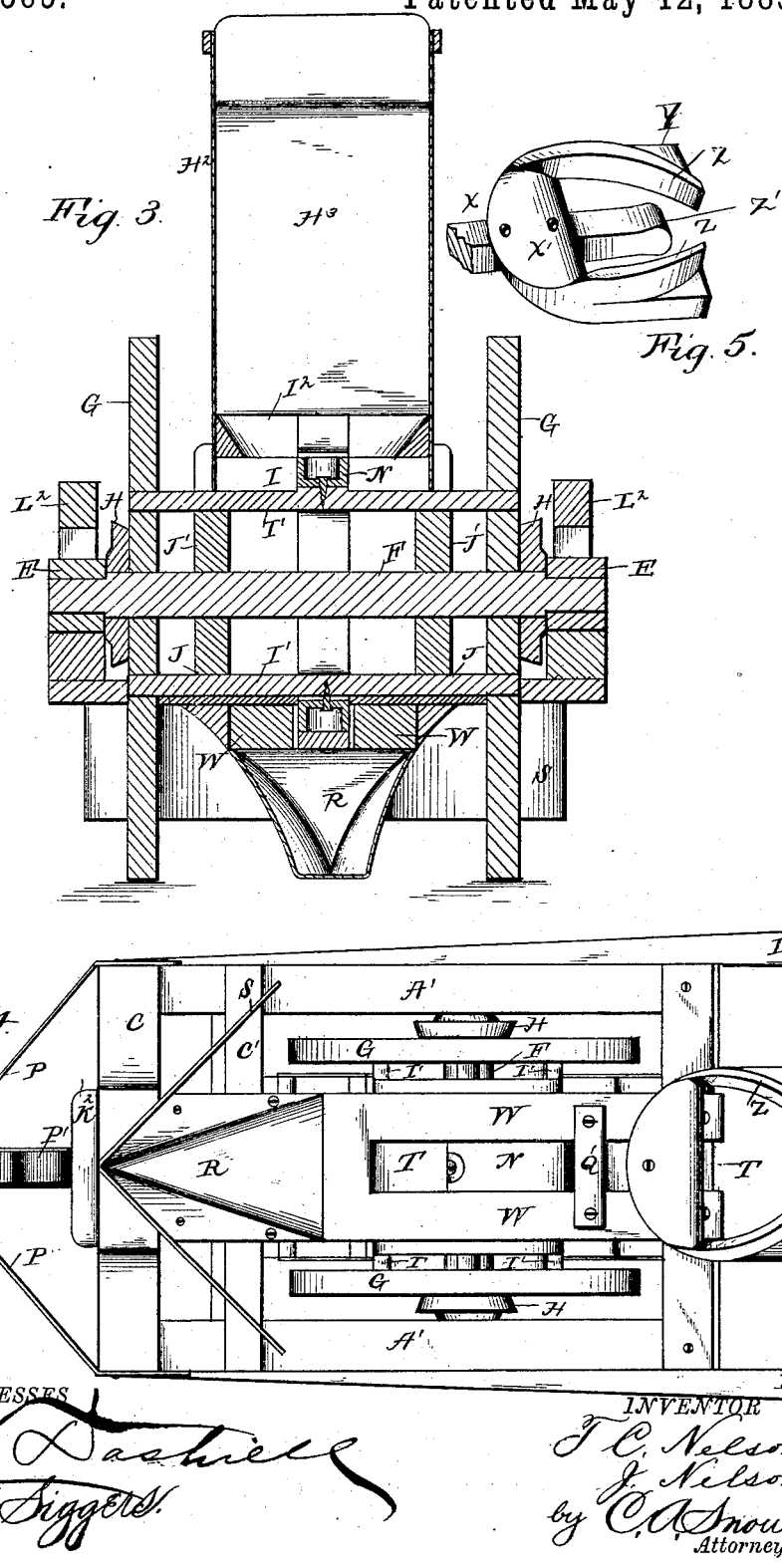

United States Patent Office.

TIBERIUS CRASHUS NELSON AND JESSE NELSON, OF HANRAHAN, N. C.

RICE-PLANTER.

SPECIFICATION forming part of Letters Patent No. 317,565, dated May 12, 1885.

Application filed July 22, 1884. (No model.)

*To all whom it may concern:*

Be it known that we, TIBERIUS C. NELSON and JESSE NELSON, citizens of the United States, residing at Hanrahan, in the county of Pitt and State of North Carolina, have invented a new and useful Improvement in Rice-Planters, of which the following is a specification, reference being had to the accompanying drawings.

Our invention has relation to rice-planters; and it has for its object to provide an implement of the class referred to that shall possess superior advantages in point of simplicity, cheapness, durability, and general efficiency; and the invention consists in the construction and novel arrangement of parts, as will be hereinafter fully described, and particularly pointed out in the claims.

In the drawings, Figure 1 is a view, in perspective, of a rice-planter embodying our improvements. Fig. 2 is a vertical longitudinal sectional view. Fig. 3 is a transverse vertical sectional view on the line of the axle. Fig. 4 is a bottom view, and Fig. 5 is a detail view of the covering-shoe.

Referring by letter to the accompanying drawings, A designates the frame of the planter, which is composed of the side rails, A' A', the rear rails, B B', the front rails, C C', beneath the side rails, A' A', and the rails D D' on the side rails, A' A'. The side rails, A' A', are provided in the rear of their middle portions with boxes E, in which the axle F is journaled.

On the axle F are fixed the driving and supporting wheels G G. These wheels G G are made of solid disks bored at the centers and secured to the axle through collars H on their outer faces. The wheels are connected by the dropper-frame I, which consists of four transverse strips, I', of wood, let into mortises in the wheels arranged on the line of a circle at intervals of ninety degrees, and also let into notches or recesses J in the peripheries of two wooden disks, J', fixed upon the axle between the wheels G G.

The dropping-frame I is encircled at its middle by a wooden dropping-band, N, having four seed-cups, K, through which the securing-screws L are passed into the transverse strip I', to secure the dropping-band N in place on said frame I.

The draft-beam O is secured between the upper and lower front rails of the frame A, and is braced by side braces, P P, extending from its front end to the front corners of the frame A, and by an under brace, P', secured to the lower front rail of said frame A.

A bifurcated breast-beam, Q, extends the entire length of the frame A, and is secured to the under faces of the lower cross-rails of the frame A between the wheels G G. The forward end of the breast-beam Q is beveled from both sides to its middle to form a point.

To the under face of the breast-beam Q, at its pointed end, is secured the furrow-opener R, which is nearly V shape in cross-section at its rear end and tapers forward to a point, its upper edges being flanged to correspond in outline to the front end of the breast-beam at its sides and point, as shown. In front of the opener R is secured the fender S, the arms of which diverge toward the rear of the frame, and extend beyond the line of the wheels. The bottom of the opener R inclines from its rear end forwardly and upwardly till it meets the lower line of the fender S at the point of the latter. The rear end of the opener R is about on a level with the bottoms of the wheels G G.

In the forward end of the bifurcations T in the breast-beam Q is secured the lower end of a wooden standard, U, the height of which is a little greater than the diameter of the dropping-band N. The rear edge of the standard U is cut to form a concave or arc a little larger than the arc of the dropping-band N, which it receives. This concave or arc V is faced with a curved strip of sheet or band iron, which is secured to it by screws, and extends rearwardly on a curved line beyond the under or lower end of the standard U along the periphery of the dropping-band N, as shown. This strip of iron prevents the seed from dropping from the seed-cups in the dropping-band until the seed-cups are practically inverted.

The under faces of the rear ends of the arms of the breast-beam Q are cut away, as shown, and in front of these reduced portions and between said arms W W is pivoted the tongue X of a horseshoe-shaped coverer, Y. The toe portion X' of the coverer Y is rounded on its under face, while the top surface of the entire coverer is flat.

From the toe portion of the coverer, along the under faces of the arms of the shoe Y, and along their inner edges, are inwardly-curved and vertically-depending flanges Z. The arms of the shoe approach each other at their rear ends, and leave a space, Z', between them, which causes the coverer Y to form the dirt into ridges over the lines of the seed.

The arms of the breast-beam Q are strengthened by a transverse brace, Q', secured to their under faces below the pivot-rod $Q^2$, on which the tongue X of the coverer Y is hinged.

The seed-hopper $H^2$ is made in two compartments, $H^3$ and $H^4$. The compartment $H^4$ is a magazine for carrying extra seed, and it does not communicate with the hopper proper. The bottom of the hopper $H^3$ is provided with a discharge-opening, $I^2$, through which the seed falls from the seed-cups into the furrow, where it is covered by the coverer Y. The bottom of the hopper $H^3$ is beveled from its walls to the edges of the discharge-opening $I^2$, so that the seed will naturally seek said opening $I^2$. The hopper is secured to the frame A at its rear end by two screws passed through the upper rear rail of the frame into the legs $J^2$ of the hopper, and at its front end by a single screw passed through a strip, $K^2$, on the frame into the front wall of the hopper, so that the hopper is readily detachable from the frame when necessary to make repairs.

The handles $L^2$, by which the implement is guided, are secured to the upper front rail of the frame by staples or clips $P^2$, and the cross-piece $Q^3$, which connects them, is secured to the rear end of the hopper, near its upper end, by two screws, so that the handles are also readily detachable.

From the foregoing description, taken in connection with the accompanying drawings, the construction and operation of the invention will be readily understood.

Having thus fully described our invention, what we claim as new, and desire to secure by Letters Patent of the United States, is—

The frame provided with a furrow-opener at its front end, a seed-dropping mechanism, and the coverer and ridger Y, which is secured to a tongue that is pivoted to the rear end of the frame, said coverer and ridger being shaped like a horseshoe, and having the rounded front portion, X', and the depending curved flanges Z on its lower side, substantially as described.

In testimony that we claim the foregoing as our own we have hereto affixed our signatures in presence of two witnesses.

TIBERIUS CRASHUS NELSON.
JESSE NELSON.

Witnesses:
ROBERT GREENE,
JOHN R. HART.